United States Patent Office 3,409,478
Patented Nov. 5, 1968

3,409,478
AEROSOL BRAZING FLUX AND METHOD OF BRAZING THEREWITH
Fletcher H. Condit, Wilmington, Del., and Richard H. Hemmenway, Summit, N.J., assignors to Allied Chemical Corporation, New York, N.Y., a corporation of New York
No Drawing. Filed Sept. 22, 1965, Ser. No. 489,415
8 Claims. (Cl. 148—23)

ABSTRACT OF THE DISCLOSURE

Brazing flux for silver alloy brazing adapted for application as an aerosol spray, comprising a flux powder suspended in a major proportion of a lower aliphatic monohydric alcohol and a minor proportion of an alkylene glycol or polymer thereof of viscosity between 50 centipoises and 100 centipoises, said suspension being dispersed in an aerosol propellent.

---

This invention relates to a brazing flux for silver alloy brazing and more particularly to a brazing composition adapted for application as an aerosol spray to deliver a thick, smooth, non-flowing paste to the article to be brazed.

In the fabrication of metals, it is often necessary to join metal parts together. This is most often done by welding, which involves distributing a filler metal between the parts to be joined and coalescing the parts by melting the filler metal at elevated temperatures. Brazing may be defined as welding, wherein coalescence is produced by heating to suitable temperature above 800° F. and by using an nonferrous filler metal having a melting point below that of the base metals. The filler metal or solder, usually containing substantial proportions of silver, alloyed with other metals such as copper, zinc, cadmium, nickel, tin, etc., is distributed between the closely fitted surfaces to be joined by capillary action.

To achieve a good joint, the parts must be clean, and a flux is therefore provided to protect the metal during brazing and to prevent oxidation and/or remove any oxides formed in the brazing process.

Brazing fluxes are constituted of mixtures of inorganic chemicals which, when heated, become molten and flow by capillarity along the area to be brazed and remain in contact with the braze area, and have the capacity to inhibit further formation of oxides, until displaced by the molten brazing filler metal.

A large number of chemical compounds are useful in formulating fluxes, and alkali metal borates, fluoborates and fluorides and chlorides, as well as borax, boric acid and alkalies have been employed.

Fluxes are most commonly applied in the form of aqueous pastes by dipping the parts in the paste or by brushing the paste onto the surface of the area to be brazed. Attempts at spraying the paste onto the work have been largely unsuccessful since the paste must be warmed to a flowable consistency before spraying and even so, is usually too thick for good atomization. If diluted, it cannot be applied in sufficient thickness, except by multiple passes, and then tends to sag or run off of vertical and steeply inclined surfaces.

It is an object of the present invention to provide a brazing flux composition adapted to be sprayed from an aerosol type container, and to deliver a thick, smooth, even coating of flux solids, with little or no tendency to sag or run off or migrate from the area to which it is applied.

These and other objects are accomplished according to our invention wherein a substantially anhydrous dispersion of suitable brazing flux solids in a mixture of a major proportion of relatively volatile lower aliphatic alcohol and a minor proportion of a relatively nonvolatile alkylene glycol having a viscosity between about 50 centipoises and about 100 centipoises at 20° C. is prepared with the aid of a small amount of a surface active agent, and dispersed in sufficient quantity of a propellent liquid in a pressurized container to produce a self-propelled stream of dispersed flux solids when the valve of the pressurized container is actuated.

Any suitable brazing flux solids mixture can be used which will provide the desired fluxing action upon the work being brazed. The flux solids should preferably be relatively free of sodium to prevent excessive glare during the brazing operation.

Especially suitable flux solids powders for use with silver solders, i.e., with solders containing at least about 5% silver, preferably 30% to 80% silver, alloyed with other metals such as copper, zinc, cadmium, tin, etc., are those composed of potassium, boron and fluorine compounds having a potassium to boron to fluorine weight ratio of approximately 10 to 4 to 7. Such fluxes are useful as general purpose fluxes which can be used in the great majority of brazing operations. Such flux solids can be made up of a number of individual compounds, blended to give the desired ratio of elements.

A number of ilustrative flux powders are set forth below.

Flux powder No. 1:     Weight percent dry solids
    Potassium pentaborate ($KB_5O_8$) _____ 53
    Potassium bifluoride ($KHF_2$) _____ 47

100

|   | Weight percent | Ratio |
|---|---|---|
| K | 32.6 | 10 |
| B | 13.0 | 4 |
| F | 22.8 | 7 |

Flux powder No. 2:     Weight percent dry solids
    Potassium bifluoride ($KHF_2$) _____ 39
    Potassium bifluoride ($KHF_2$) _____ 39
    Boric acid ($H_3BO_3$) _____ 37.8

100.0

|   | Weight percent | Ratio |
|---|---|---|
| K | 27.25 | 10 |
| B | 9.90 | 3.63 |
| F | 19.0 | 7.5 |

Flux powder No. 3:     Weight percent dry solids
    Potassium hydroxide (KOH) _____ 10.1
    Boric acid ($H_3BO_3$) _____ 55.2
    Potassium bifluoride ($KHF_2$) _____ 34.7

100.0

|   | Weight percent | Ratio |
|---|---|---|
| K | 24.3 | 10 |
| B | 9.66 | 3.9 |
| F | 16.88 | 6.9 |

Flux powder No. 4:     Weight percent dry solids
    Potassium hydroxide (KOH) _____ 24.1
    Potassium fluoborate ($KBF_4$) _____ 30.8
    Boric acid ($H_3BO_3$) _____ 45.1

100.0

|   | Weight percent | Ratio |
|---|---|---|
| K | 26.3 | 10 |
| B | 10.55 | 4 |
| F | 18.6 | 7 |

Flux powder No. 5:         Weight percent dry solids

Potassium pentaborate ($KB_5O_8$) _____ 50
    Potassium bifluoride ($KHF_2$) _____ 50

100

|   | Weight percent | Ratio |
|---|---|---|
| K | 33.5 | 10 |
| B | 12.2 | 3.94 |
| F | 24.3 | 7.2 |

Flux powder No. 6:         Weight percent dry solids

Potassium pentaborate ($KB_5O_8$) _____ 60
    Potassium bifluoride ($KHF_2$) _____ 40

100

|   | Weight percent | Ratio |
|---|---|---|
| K | 30.3 | 10 |
| B | 13.7 | 4.5 |
| F | 19.4 | 6.4 |

Our preferred flux powders are those prepared solely from potassium pentaborate and potassium bifluoride, preferably consisting of from about 50% to about 60% of potassium pentaborate, the balance (50% to 40%) being potassium bifluoroide. These compositions have the advantage of requiring only two components to supply the desired ratios of potassium to boron to fluorine.

While the above ratio of potassium to boron to fluorine is preferred, other flux powders may be used which are outside the indicated ratio. In fact, boric acid alone can be used. Addition of a fluorine-containing compound, however, provides a solvent for the oxides and thus aids in oxide removal during brazing.

The components in the above fluxes are indicated on a dry basis. Certain of the components as commercially available, may be in hydrated form, for example, potassium pentaborate is often marketed as the octahydrate ($K_2O \cdot 5B_2O_3 \cdot 8H_2O$) and potassium tetraborate is available as the tetrahydrate or pentahydrate, e.g.

$$(K_2O \cdot 2B_2O_3 \cdot 4H_2O)$$

In cases where hydrates are used, enough of these components will of course be used to provide the desired dry solids content, and will be dehydrated prior to final compounding into the aerosol flux composition.

The volatile alcohol which forms parts of the dispersing vehicle can be any lower aliphatic monohydric alcohol of 1 to 4 carbon atoms or mixture thereof. Methanol and ethanol are preferred. The propanols and butanols are satisfactory, but lack the high volatility of the two lower alcohols. Butanol, moreover, has an unpleasant odor and would not be used as the entire volatile alcohol component where this feature is objectionable. Either absolute ethanol or the common 95% ethanol of commerce, containing about 5% water, can be used. It is important, however, that the aerosol composition as a whole be substantially free of water, that is, it should contain not more than about 5% water in the total composition, since, even with the very slight water solubility of the solid flux components, some solvation and resultant crystal formation may occurr which results in clogging of the aerosol valve by the crystals.

The alkylene glycol component which forms a minor proportion of the vehicle for the dispersed flux solids is critical as to both character and amount and should be of such viscosity and used in such amount with relation to the flux solids, as to be able to adequately disperse the flux solids and to bind the solids firmly onto the work without sagging or run-off, but should not be of such character as to cause excessive carbonization on the work. Alkylene glycols, including polymers thereof, having viscosities at 20° C. between about 50 centipoises and about 100 centipoises are satisfactory, those having viscosities between about 50 and about 65 are preferred. Especially suitable are propylene glycol and the polypropylene glycols of molecular weight below about 1,000, preferably below about 500, including propylene glycol (monomer) of molecular weight 76.1, and viscosity of about 60.5 centipoises at 20° C., polypropylene glycol 150 of molecular weight about 150 and viscosity of about 52 centipoises; and polypropylene glycol 425, of molecular weight about 425 and viscosity of about 62 centipoises. Alkylene glycols of lower viscosities than about 50 centipoises fail to produce adequately stable dispersions of flux solids; glycols of higher viscosities than about 100 centipoises fail to properly bind the flux solids. Propylene glycol is preferred. Ratios of alkylene glycol to flux solids should be between about 0.05:1 and about 0.3:1. Higher amounts of alkylene glycol tend to cause excessive carbonization; lower proportions produce inadequate binding of the solids and result in poor spraying, sagging and uneven lumpy deposition of the solids on the work.

Any of the common propellants conventionally used in aerosol mixtures may be used to provide the necessary propellency and atomization of the dispersion. Suitable propellants, therefore, include the volatile haloalkanes or mixtures thereof whose boiling points at atmospheric pressure are below atmospheric temperature, preferably below about 25° C. Haloalkanes, and especially the fluorochloroalkanes having 1 to 2 carbon atoms are preferred. We prefer to use the so-called "high pressure" propellents to provide formulations which insure adequate atomization of the heavy solids dispersion. Such propellents provide a gauge pressure somewhat in excess of 40 pounds per square inch at 70° F. and may include propellent compounds alone or mixtures of one or more propellents with compatible diluents to provide the desired pressure, between about 40 p.s.i.g. and about 60 p.s.i.g. at 70° F. preferably about 50 p.s.i.g.

Typical propellents and propellent constituents are listed below:

| Propellent: | Boiling point, ° C. |
|---|---|
| $CCl_2F_2$ | −29 |
| $CClF_3$ | −82 |
| $CHCl_2F$ | +8 |
| $CHClF_2$ | −41 |
| $CH_3CHF_2$ | −26 |
| $CH_3CClF_2$ | −10 |
| $CCl_3F$ | +24 |
| $CClF_2CClF_2$ | +4 |

In our compositions the lower aliphatic alcohols and the alkylene glycols act as diluents.

Proportions of the components in the preferred compositions of our invention are sutiably in the ranges set forth below:

|   | Percent by weight |
|---|---|
| Flux powder | 30–50 |
| Volatile alcohol | 35–15 |
| Alkylene glycol | 3–10 |
| Surfactant | 0.05–0.10 |
| Propellent | 40–25 |

The individual compositions will be formulated so as to provide a ratio of alkylene glycol to flux solids of at least about 0.05:1 and not more than about 0.3:1. The volatile alcohol and propellent mixture should provide a vapor pressure at 70° F. of at least about 40 p.s.i.g., preferably between about 40 p.s.i.g. and about 60 p.s.i.g., in order to adequately and smoothly atomize the flux solids.

In preparing the brazing fluxes of our invention, the flux solids are mixed and, if necessary, are dehydrated. The solids are then mixed with the liquid portion of the composition, exclusive of propellent, that is, with the volatile alcohol, the alkylene glycol and the surfactant. Any suitable surface active agent can be used to disperse the flux solids in the alcohol-glycol vehicle, preferably those of non-ionic character such as condensates of ethylene oxide with alkyl phenols. This mixture is milled or otherwise treated to thoroughly disperse the solids in the liquid vehicle and to reduce the particle size of the solids to below the size of the aerosol can orifice, i.e., below about 0.3 inch, e.g., usually to below about 750 microns. If desired, the milling can be carried out using only a portion of the mixed alcohol vehicle, and then diluted with the remaining alcohol vehicle to the desired dilution. The dispersed flux solids composition is finally placed in suitable pressure containers which are then filled with the required proportion of propellent to effect the desired final composition.

In applying the flux to the material to be brazed, the valve of the aerosol can is depressed and the emerging spray is directed upon the work, suitably by a back and forth or up and down motion, using one or more passes depending on the thickness of flux coating desired and the solids content of the flux dispersion. During atomization, substantially the entire vehicle volatilizes with the exception of the alkylene glycol so that the composition actually deposited on the work consists essentially of flux solids and surfactant dispersed in the glycol.

The following specific examples further illustrate our invention. Parts are by weight except as otherwise noted.

Example 1

Eighty-eight pounds of a dry brazing flux powder containing 53 pounds of potassium pentaborate ($KB_5O_8$) and 35 pounds of potassium bifluoride ($KHF_2$) was mixed with 64 pounds of methanol and 8 pounds of propylene glycol and the mixture was milled in a ball mill for 4 hours with about .1% of a non-ionic surfactant (Igepal CA–630, an alkyl phenol ethylene oxide reaction product), and produced a stable dispersion which did not settle out appreciably on standing quiescent for two weeks. The resulting dispersion was filled into pressurized aerosol containers using 70% of the dispersion and 30% of dichlorodifluoromethane (Genetron 12). The resulting aerosol mixture had the following composition.

| | Percent by weight |
|---|---|
| Potassium pentaborate | 23.2 |
| Potassium bifluoride | 15.3 |
| Methanol | 27.9 |
| Propylene glycol | 3.5 |
| $CCl_2F_2$ | 30.0 |
| Surfactant [1] | 0.1 |
| | 100.0 |

[1] Octylphenoxypoly(ethyleneoxy)ethanol (Igepal CA–630).

The above composition was sprayed onto 1" x 6" copper and steel coupons while being held in nearly vertical position. The spraying operation deposited a smooth, thick pasty white coating which had no tendency to sag or run. The coated work was heated to about 1300° F. for 4 minutes and then examined for degree of protection. Only a slight darkening of the work at the top was noted. 1" x 1" coupons of the same metals were coated and a ¼" piece of silver solder wire, 16 gauge, placed on each coupon. The work was again heated to 1300° F. for 4 minutes. All showed complete protection over the whole area. Solder flow was good judged by feather edge and area of spread. The silver solder used contained 45% Ag, 15% Cu, 16% Zn, 24% Cd.

The flux behaved normally in the brazing operation, flowing readily by capillarity into the joint to be brazed, and a satisfactory joint was thus obtained. In this respect the aerosol-applied flux behaved equally as well as a similar flux applied as an aqueous dispersion by brushing onto the work, with a great saving of time and effort in the application of the flux.

To test the efficacy of other glycols, like dispersions were prepared substituting proportions of two polypropylene glycols, one of 150 molecular weight and a viscosity of 52 centipoises at 20° C., the other of 425 molecular weight and viscosity of 62 centipoises in the formula shown above. Upon ball milling the flux powder-methanol-polypropylene mixtures, smooth dispersions were obtained in which the solids remained adequately in suspension upon standing quiescent for 2 weeks indicating that these polypropylene glycols are suitable for use in our invention.

Lower viscosity glycols including ethylene glycol (viscosity 21 centipoises) and triethylene glycol (viscosity 49 centipoises) when similarly substituted in the above formula and milled, produced mixtures from which the solids settled out on standing for two weeks and in which the settled solids could not readily be redispersed on shaking, and which accordingly were unsuitable for use in our compositions.

Example 2

A coil header made of 3" welded steel channel was assembled with thirty-four ⅝" O.D. copper tubes in a double row, staggered pattern.

A flux suspension, packaged in an aerosol pressure can, having the following composition:

| | Weight percent |
|---|---|
| Potassium pentaborate | 20.4 |
| Potassium bifluoride | 18.1 |
| Methanol | 20.93 |
| Propylene glycol | 10.5 |
| Surfactant | 0.07 |
| $CCl_2F_2$ | 30.0 |
| | 100.0 | was sprayed down both sides of the header, resulting in a smooth coating of flux solids about 1/16 inch in thickness around the joints. The aerosol composition ejected smoothly with no valve clogging and produced a coating which felt substantially dry to the touch and had no tendency to sag on inclined sections of the work.

The fluxed joints were then torch-brazed to the header with a standard silver brazing solder of approximately the following composition:

| | Weight percent |
|---|---|
| Silver | 35 |
| Copper | 26 |
| Zinc | 21 |
| Cadmium | 18 |
| | 100 | during which operation, the flux action of the aerosol-applied flux was satisfactory and a satisfactory joint was produced.

Examples 3 and 4

Two brazing tests were carried out in which assemblies were prepared from 2" header pipes into which a number of 0.570" diameter copper extension tubes were inserted and brazed.

Example 3.—In the first assembly an aerosol brazing flux of the composition shown in Example 2 above was first sprayed on the header, then the nine copper extension nipples were placed into holes in the header. Solder rings (45% silver, 15% copper, 16% zinc, 24% cadmium) were placed around the tubes and the extensions and rings were sprayed after placing. The assembly was heated in a furnace at 1300° F. for 65 seconds. On removal from the furnace, the assembly was cooled and examined with the result that all 9 joints were completely brazed. Upon cross-sectioning and examining the insides of the joints, 6 showed 100% penetration; 3 showed very small voids, but would have been leak-tight.

Example 4.—In preparing the second assembly, 7 tubes were inserted into the header, and aerosol flux of the same composition as described in Example 2 above was sprayed from one side in two applications. Solder rings were placed around each extension tube and the assembly was heated at 1300° F. for about 60 seconds, removed from the furnace, cooled and examined. All 7 joints appeared leak-tight. Three of the joints were cross-sectioned and showed solder penetrations of substantially 100%.

Examples 5–19

Three aerosol brazing flux compositions of varying flux solids contents were tested for horizontal and vertical fluxing performance. The test compositions had the following compositions.

| Composition | A | B | C |
|---|---|---|---|
| Flux Solids: | 38.5 | 35.0 | 31.5 |
| KB₅O₈, 60% | | | |
| KHF₂, 40% | | | |
| Ethanol | 27.9 | 31.4 | 34.9 |
| Propylene Glycol | 3.5 | 3.5 | 3.5 |
| Surfactant | 0.1 | 0.1 | 0.1 |
| Propellent (CCl₂F₂) | 30.0 | 30.0 | 30.0 |
| | 100.0 | 100.0 | 100.0 |
| Ratio Propylene Glycol to Flux Solids | .09:1 | 0.1:1 | 0.11:1 |

Vertical tests

For the vertical tests, low carbon steel strip specimens about 1" wide, .050" thick and 6" long were bent to give an L-shaped specimen with the vertical portion to be coated about 4" long. These surfaces were scrubbed with 3-0 emery paper and were then washed (degreased) with acetone solvent. Separate specimens were then sprayed with each of the above formulations with a side-to-side motion from a distance of about 12" to 16" to give coatings of two different weights, weighed 15 minutes after application, for each composition. "Run down" of the flux during the spraying and after spraying was observed to be negligible in every case. In every case, the compositions atomized satisfactorily and no valve clogging occurred even when cans were completely voided with intermittent spraying.

The coated specimens prepared as above were placed in a charging tray and placed in a muffle furnace at 1300° F. and left in the furnace 2¾ minutes, providing ½ minute at the 1300° F. temperature. The test specimens were removed from the furnace and observed after cooling for degree of protection of the metal by the flux coating. A satisfactory performance is indicated when the area on the steel protected by the flux coating is 50% or better.

Results of the vertical tests are shown in Table I below.

TABLE I.—PERFORMANCE TESTS—VERTICAL FLUX APPLICATION

| Example No. | Composition | Percent Solids | Grams on Vertical 15 Minutes After Application [1] | Degree of Metal Protection After 2¾ Minutes in 1,300° F. Furnace |
|---|---|---|---|---|
| 5 | A | 38.5 | 1.16 | Good. [2] |
| 6 | A | 38.5 | 0.42 | Do. |
| 7 | B | 35.0 | 2.17 | Do. |
| 8 | B | 35.0 | 0.59 | Do. |
| 9 | C | 31.5 | 1.57 | Do. |
| 10 | C | 31.5 | 0.76 | Do. |

[1] Normal paste flux application is about 0.8 gram.
[2] Good means more than 50% of steel was covered by flux coating at close of test.

It will be noted from Table I that vertical protection by the flux was good, even at application weights as low as about half that of normal paste application weights.

Horizontal tests

In making the horizontal brazing tests, metal coupons 1¼ inches square by .050 to .065 inch thick of three different metal types, (a) low carbon steel (CS), (b) type 304 stainless steel (304 SS) and (c) type 430 stainless steel (430 SS) were cleaned by scrubbing with 3-0 emery paper. Then the entire top surface of a coupon of each type was spray coated with each of the above aerosol flux compositions with different weights of flux solids on each, varying between about 0.2 and 5.0 gram weights 15 minutes after spraying. On the center of each coupon was placed a wire sample (0.62" diameter x ½" long) of silver brazing alloy (35% Ag, 26% Cu, 21% Zn, 18% Cd). The specimens were then placed on a tray and heated in a furnace set at 1300° F. for a total time of 4½ minutes. The flux is considered satisfactory if it has protected the metal surfaces surrounding the brazing alloy, and has promoted wetting and spreading on the base metal to a minimum area of about 0.3 square inch and if no balling of the brazing alloy or excessive oxidation of the base metal has occurred.

Results of the horizontal brazing test are shown in Table II below.

TABLE II.—PERFORMANCE TESTS—HORIZONTAL FLUX APPLICATION

| Example No. | Composition | Percent Solids | Coupon Metal | Grams on Coupon 15 Minutes After Application [1] | Solder Spread |
|---|---|---|---|---|---|
| 11 | A | 38.5 | CS | .09 | OK |
| 12 | A | 38.5 | 304 SS | .33 | OK |
| 13 | A | 38.5 | 430 SS | .11 | OK |
| 14 | B | 35.0 | CS | .14 | OK |
| 15 | B | 35.0 | 304 SS | .50 | OK |
| 16 | B | 35.0 | 430 SS | .22 | OK |
| 17 | C | 31.5 | CS | .18 | OK |
| 18 | C | 31.5 | 304 SS | .29 | OK |
| 19 | C | 31.5 | 430 SS | .22 | OK |

[1] Normal application of flux in paste form is about 0.23 to 0.36 gram on coupon.

It will be noted from Table II that solder spread was "OK," i.e., satisfactory, in all cases even where amounts of flux applied were only about half the amount normally applied by paste application.

While the above describes the preferred embodiments of our invention, it will be understood that departures can be made therefrom within the scope of the specification and claims.

We claim:

1. A self-propelling brazing flux capable of depositing a substantially non-fluent coating of flux solids upon a substrate, comprising between about 30% and about 50% of finely divided solid flux powder of particle size less than about 750 microns, suspended in a mixture of a major proportion of a monohydric aliphatic alcohol of 1 to 4 carbon atoms and a minor proportion of an alkylene glycol or polymer thereof, said alkylene glycol or polymer having a viscosity at 20° C. between about 50 centipoises and about 100 centipoises, said suspension being dispersed in between about 40% and about 25% of a liquid propellent capable of generating in such mixture a vapor pressure of at least about 40 pounds per square inch, the weight ratio of said alkylene glycol to said flux solids being between about 0.05:1 and about 0.3:1, and the composition containing not more than about 5% water.

2. The composition of claim 1, wherein the solid flux powder is a mixture of potassium, boron and fluorine compounds providing a potassium to boron to fluorine ratio of approximately 10:4:7.

3. The composition of claim 1 wherein the alkylene glycol is propylene glycol, or a polymer thereof of molecular weight below about 500.

4. The composition of claim 1 wherein the alkylene glycol is propylene glycol.

5. The composition of claim 1 wherein the monohydric alcohol is methanol.

6. The composition of claim 1 wherein the monohydric alcohol is ethanol.

7. A self-propelling brazing flux comprising between about 30% and about 50% of finely divided solid flux powder, said solid flux powder consisting of a mixture of about 60% potassium pentaborate and about 50% potassium bifluoride, and being of a particle size less than about 750 microns, said solid flux powder being suspended by means of between about 0.05% and about 0.1% of a surface active agent in a mixture of ethanol and propylene glycol, the latter being present in a proportion sufficient to provide a weight ratio of propylene glycol to flux solids between about 0.05:1 and about 0.3:1, said suspension being dispersed in between about 25% and about 40% by weight of dichlorodifluoromethane as propellent, all percentages being based on the total weight of the composition.

8. A self-propelling brazing flux capable of depositing a substantially non-fluent coating of flux solids upon a substrate, comprising between about 30% and about 50% of finely divided solid flux powder of particle size less than about 750 microns, said powder being a mixture of potassium, boron and fluorine compounds providing a potassium to boron to fluorine ratio of approximately 10:4:7; said flux being suspended in a mixture of a major proportion of a monohydric aliphatic alcohol of 1 to 4 carbon atoms, and a minor proportion of propylene glycol, said suspension being dispersed in between about 40% and about 25% of a liquid propellent capable of generating in such mixture a vapor pressure of at least about 40 pounds per square inch, the weight ratio of said propylene glycol to flux solids being between 0.05:1 and about 0.3:1 and the composition containing not more than about 5% water.

References Cited

UNITED STATES PATENTS

| | | | |
|---|---|---|---|
| 2,547,771 | 4/1951 | Pessel | 148—24 |
| 3,275,201 | 9/1966 | Tedeschi et al. | 148—23 |

L. DEWAYNE RUTLEDGE, *Primary Examiner.*

W. W. STALLARD, *Assistant Examiner.*

UNITED STATES PATENT OFFICE
CERTIFICATE OF CORRECTION

Patent No. 3,409,478                                                                  November 5, 1968

Fletcher H. Condit et al.

It is certified that error appears in the above identified patent and that said Letters Patent are hereby corrected as shown below:

Column 2, line 27, "ilustrative" should read -- illustrative --; line 42, "Potassium bifluoride ($KHF_2$)----39" should read -- Potassium tetraborate ($K_2B_4O_7$)-----23.2 --. Column 3, line 67, "occurr" should read -- occur --. Column 4, line 56, "sutiably" should read -- suitably --. Column 8, line 74, "50%" should read -- 40% --.

Signed and sealed this 10th day of March 1970.

(SEAL)
Attest:

Edward M. Fletcher, Jr.                                      WILLIAM E. SCHUYLER, JR.
Attesting Officer                                                       Commissioner of Patents